United States Patent
Ji et al.

(10) Patent No.: US 7,663,834 B2
(45) Date of Patent: Feb. 16, 2010

(54) DATA SECTOR PHASE CORRECTION METHOD AND DISK DRIVE APPARATUS USING THE SAME

(75) Inventors: Byoung Kul Ji, Suwon-si (KR); Ju-young Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 11/843,145

(22) Filed: Aug. 22, 2007

(65) Prior Publication Data

US 2008/0049355 A1 Feb. 28, 2008

(30) Foreign Application Priority Data

Aug. 23, 2006 (KR) .................... 10-2006-0079984

(51) Int. Cl.
*G11B 21/02* (2006.01)
(52) U.S. Cl. ........................................ 360/76
(58) Field of Classification Search .................. None
See application file for complete search history.

(56) References Cited

U.S. PATENT DOCUMENTS

| 5,568,606 | A * | 10/1996 | Dobbek .................... 714/8 |
| 5,729,718 | A * | 3/1998 | Au ........................... 711/167 |
| 5,835,299 | A * | 11/1998 | Lee et al. ..................... 360/76 |
| 6,067,206 | A * | 5/2000 | Hull et al. ................ 360/77.08 |
| 6,307,705 | B1 * | 10/2001 | Anderson et al. ........ 360/78.04 |
| 6,493,171 | B2 * | 12/2002 | Enokida et al. ............... 360/75 |
| 6,574,699 | B1 * | 6/2003 | Dobbek ....................... 711/4 |
| 6,848,019 | B1 * | 1/2005 | Mobley et al. ............... 711/111 |
| 6,952,322 | B1 * | 10/2005 | Codilian et al. .......... 360/77.05 |
| 6,963,462 | B2 * | 11/2005 | Satoh .......................... 360/63 |
| 7,023,648 | B2 * | 4/2006 | Mizukoshi ................... 360/75 |
| 2002/0167752 | A1 * | 11/2002 | DuLaney et al. ......... 360/77.02 |

FOREIGN PATENT DOCUMENTS

| JP | 8-180660 | 7/1996 |
| JP | 2000-123506 | 4/2000 |
| JP | 2001-14818 | 1/2001 |
| KR | 1994-16175 | 7/1994 |

* cited by examiner

*Primary Examiner*—K. Wong
(74) *Attorney, Agent, or Firm*—Stanzione & Kim LLP (57) ABSTRACT

A method to correct a phase of a data sector due to rotational slip of a disk includes measuring a difference in the phase of a servo sector between a plurality of disks and adjusting an amount of cylinder skew of a logical data sector between the plurality of disks based on the measured difference in the phase of a servo sector between the plurality of disks.

18 Claims, 7 Drawing Sheets

DATA SECTOR PHASE CORRECTION METHOD AND DISK DRIVE APPARATUS USING THE SAME

CROSS-REFERENCE TO RELATED APPLICATIONS

This application claims priority under 35 U.S.C. §119(a) from Korean Patent Application No. 10-2006-0079984, filed on Aug. 23, 2006, in the Korean Intellectual Property Office, the disclosure of which is incorporated herein in its entirety by reference.

BACKGROUND OF THE INVENTION

1. Field of the Invention

The present general inventive concept relates to a disk drive apparatus and a control method, and more particularly, to a method and apparatus to correct a phase difference of a servo sector due to rotational slip between disks in a disk drive apparatus.

2. Description of the Related Art

Korean Patent Publication No. 1994-16175 and Japanese Patent Publication No. 1996-180660 disclose technology related to a hard disk drive. Korean Patent Publication No. 1994-16175 describes converting a disk surface to be processed and accurately following the eccentricity of the converted disk surface, when a plurality of disk surfaces are present in a disk drive. Japanese Patent Publication No. 1996-180660 describes reading a plurality of disks in a disk drive using respective heads and correcting the phase of a sync timing signal by detecting an interactive rotational phase difference.

A hard disk drive apparatus (HDD) is a data storage device which stores data on a disk using a magnetic head, and is integral to many computer systems. As HDDs improve they become highly dense and compact. This is measured in BPI (bits per inch) which is the density in the direction in which the disk rotates, and TPI (tracks per inch) which is the density in the radial direction of the disk. As these parameters increase, more accurate mechanisms are required.

Since the number of tracks increases as the recording density of the HDD increases, a longer time is needed to write servo information on the disk. To solve this problem, an offline servo track write (STW) method has been developed, for writing servo information on a plurality of disks at the same time using external equipment, without coupling the disks.

The HDD often includes a plurality of disks to increase recording capacity. Accordingly, if the HDD is assembled by performing servo write in the offline STW method, the position of a servo sector varies between the disks in the rotational direction. Also, the position of the servo sector between disks can be changed in the rotational direction by an external impact. This phenomenon is referred to as rotational slip, and can change the phase of a logical data sector during disk switching.

When a logical data sector number is assigned during the disk switching without considering disk rotational slip, the phases of the logical data sectors do not match, and data read and write performance deteriorates.

SUMMARY OF THE INVENTION

The present general inventive concept provides a method to correct a phase of a data sector due to disk rotational slip by detecting the amount of rotational slip between disks and assigning a logical data sector address based on the amount of detected rotational slip, and a disk drive apparatus using the method. Also, the present general inventive concept provides a computer-readable recording medium recording a program to execute the method in a computer.

Additional aspects and utilities of the present general inventive concept will be set forth in part in the description which follows and, in part, will be obvious from the description, or may be learned by practice of the general inventive concept.

The foregoing and/or other aspects and utilities of the general inventive concept may be achieved by providing a method to correct a phase of a data sector due to rotational slip of a disk includes measuring a difference in a phase of a servo sector between a plurality of disks and adjusting an amount of cylinder skew of a logical data sector between the plurality of disks based on the measured difference in the phase of the servo sector between the plurality of disks.

The measuring of the difference in the phase of the servo sector between the plurality of disks may include reading servo sector information of one of a plurality of disks in using a head that is presently selected and storing the read servo sector information, switching an other of a plurality of disks head corresponding to another of a plurality of disks to be measured, reading servo sector information from a disk to be measured using the head that is switched and storing the read servo sector information, and calculating a difference in the phase of the servo sector between one disk and the other disk by calculating a number of servo sectors included between the servo sector information read from the one disk before the head switching and the servo sector information read from the other disk after the head switching.

The measuring of the difference in the phase of a servo sector between disks may include writing test data on the plurality of disks simultaneously, detecting a difference in a position where the test data is written with respect to a reference coordinate for each of the plurality of disks, and calculating a difference in the phase of the servo sector between the plurality of disks based on the difference of the position where the test data is written between the plurality of disks detected in the detecting of the difference of the position where the test data is written with respect to the reference coordinate for each disk.

The foregoing and/or other aspects and utilities of the general inventive concept may also be achieved by providing a disk drive apparatus including a plurality of disks to store information, a plurality of transducers to write or to read information with respect to the plurality of disks, and a controller to measure a phase difference of a servo sector between the plurality of disks, to adjust an amount of cylinder skew of a logical data sector between the plurality of disks based on the measured phase difference of the servo sector between the plurality of disks, and to assign a logical data sector address during a switching of the disks to be accessed by reflecting the adjusted cylinder skew amount.

The foregoing and/or other aspects and utilities of the general inventive concept may also be achieved by providing a computer-readable recording medium having embodied thereon a computer program code to execute method.

The foregoing and/or other aspects and utilities of the general inventive concept may also be achieved by providing a method of assigning an address to a sector in a disk drive apparatus having a plurality of disks, the method including detecting an amount of rotational slip and assigning an address to a sector based on the detected amount of the rotational slip.

The foregoing and/or other aspects and utilities of the general inventive concept may also be achieved by providing a sector control apparatus usable with a disk drive apparatus having a plurality of disks, the sector control apparatus including a detector to detect an amount of rotation slip and a controller to assign an address to a sector based on the detected amount of rotational slip.

The foregoing and/or other aspects and utilities of the general inventive concept may also be achieved by providing a disk drive apparatus including a plurality of disks and a sector control apparatus including a detector to detect an amount of rotation slip and a controller to assign an address to a sector disposed on one of the plurality of disks based on the detected amount of rotational slip.

The foregoing and/or other aspects and utilities of the general inventive concept may also be achieved by providing a method of adjusting a cylinder skew of a sector in a disk drive apparatus having a plurality of disks, the method including measuring an amount of rotational skip between disks with respect to a cylinder of the disks and adjusting an amount of the cylinder skew of the sector during a disk switching operation based on the measured amount of rotational skip.

The foregoing and/or other aspects and utilities of the general inventive concept may also be achieved by providing a sector control apparatus usable with a disk drive apparatus having a plurality of disks, the sector control apparatus including a measuring unit to measure an amount of rotational skip between disks with respect to a cylinder of the disks and a controller to adjust an amount of cylinder skew of a sector during a disk switching operation based on the measured amount of rotational skip.

The foregoing and/or other aspects and utilities of the general inventive concept may also be achieved by providing a disk drive apparatus, including a plurality of disks and a sector control apparatus including a measuring unit to measure an amount of rotational skip between disks with respect to a cylinder of the disks and a controller to adjust an amount of cylinder skew of a sector disposed on one of the plurality of disks during a disk switching operation based on the measured amount of rotational skip.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 1:
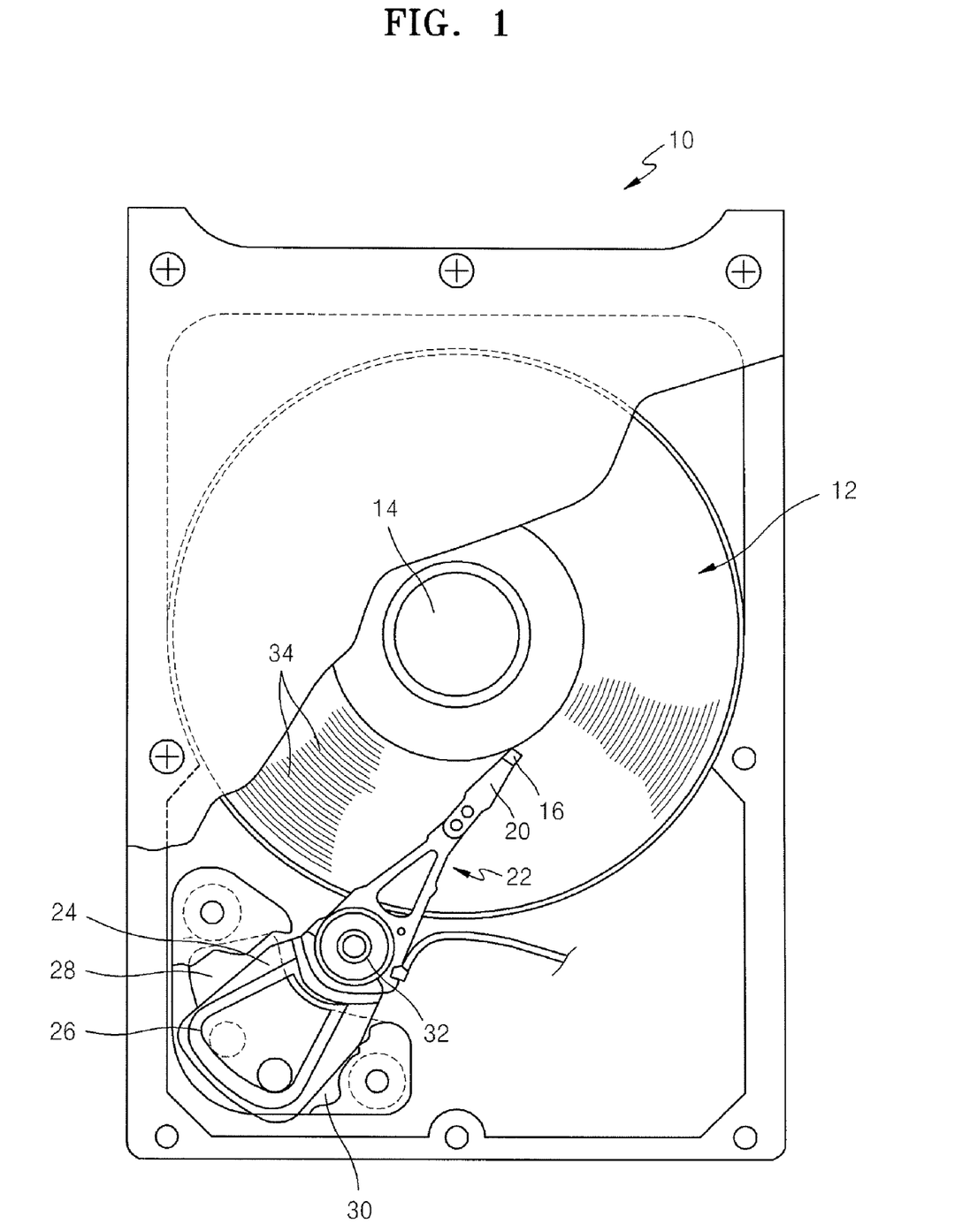
FIG. 1 is a plan view illustrating a head disk assembly of a disk drive apparatus according to an embodiment of the present general inventive concept.

A hard disk drive apparatus (HDD) is a combination of a head disk assembly (HDA), formed of mechanical units, and an electrical circuit. FIG. 1 is a plan view of an HDA 10 of a disk drive apparatus according to an embodiment of the present general inventive concept. Referring to FIG. 1, the HDA 10 includes at least one magnetic disk 12 rotated by a spindle motor 14. The HDD also includes a transducer 16 located close to a disk surface.

The transducer 16 can read or write information on the rotating disk 12, by detecting or applying a magnetic field to the disk 12. The transducer 16 is typically associated with the surface of the disk 12. Although the transducer 16 is described as a single transducer, the transducer 16 may include a write transducer to magnetize the disk 12 and a read transducer to detect the magnetic field of the disk 12. The read transducer is formed of a magneto-resistive (MR) device. The transducer 16 is typically referred to as a head.

The transducer 16 can be integrated into a slider 20. The slider 20 has a structure which generates an air bearing between the transducer 16 and the surface of the disk 12, and is coupled to a head gimbal assembly 22. The head gimbal assembly 22 is attached to an actuator arm 24 having a voice coil 26. The voice coil 26 is located close to a magnetic assembly 28 to define a voice coil motor (VCM) 30. Current supplied to the voice coil 26 generates torque to rotate the actuator arm 24 around a bearing assembly 32. The rotation of the actuator arm 24 moves the transducer 16 across the surface of the disk 12.

Figure 2:
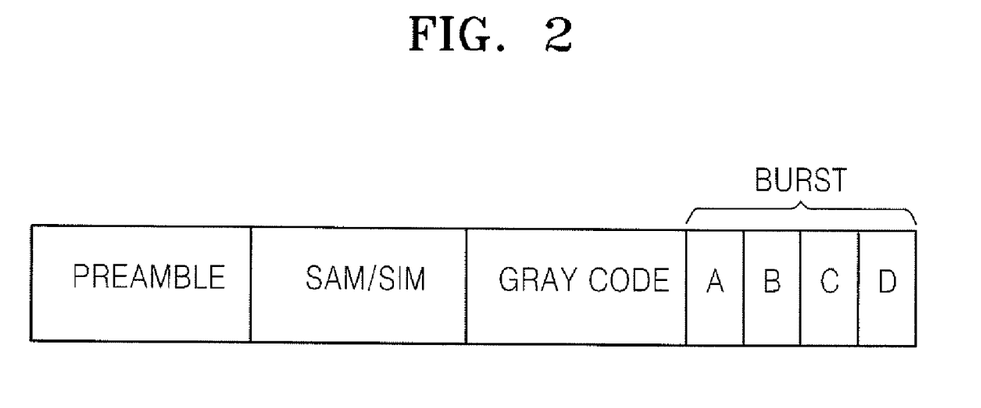
FIG. 2 illustrates a pattern of servo information written on a disk of a general HDD according to an embodiment of the present general inventive concept.

Information is typically stored in a plurality of circular tracks 34 on the disk 12. Each of the tracks 34 generally includes a plurality of sectors. Each sector includes a servo sector and a data sector. Servo signals are recorded in the servo sector as illustrated in FIG. 2, and includes a preamble, a servo address/index mark (SAM/SIM), a gray code, and burst signals A, B, C, and D. The preamble is provided to set clock sync and variable gain. The servo address mark SAM indicates the start of the servo sector, and the servo index mark SIM provides information on one rotation of the disk.

The gray code provides track information and sector information. The burst signals A, B, C, and D are used to control the position of the head.

Figure 3:
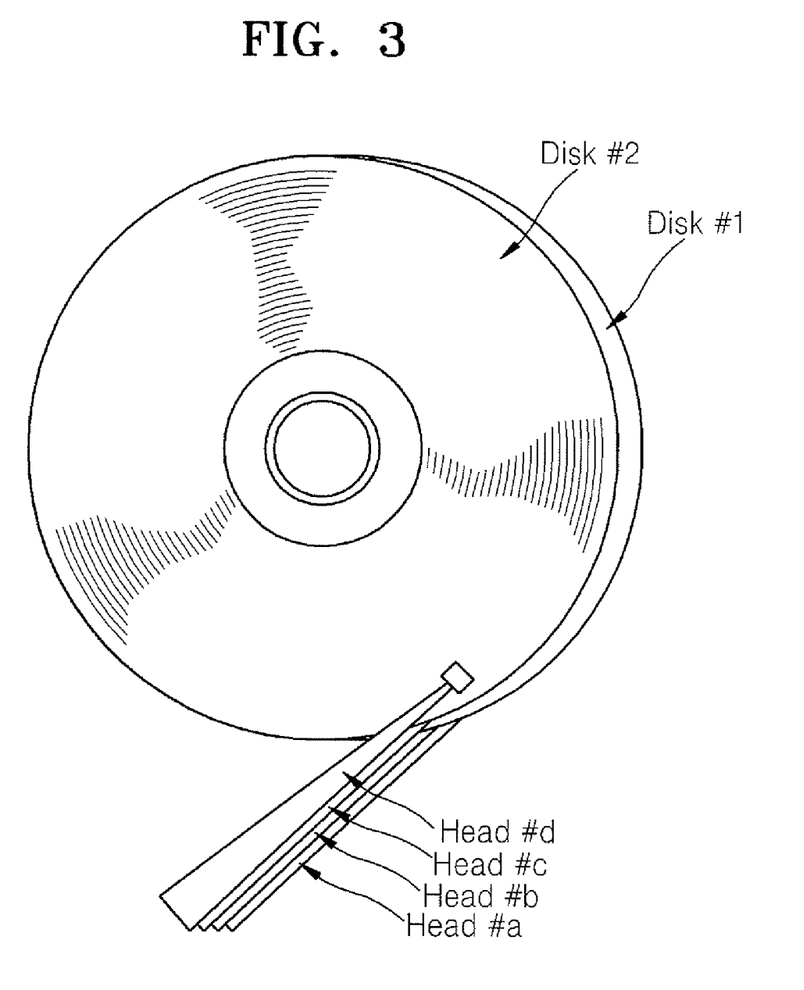
FIG. 3 illustrates a structure of a disk drive apparatus having a plurality of disks according to an embodiment of the present general inventive concept.

The HDD generally has a plurality of disks and a corresponding number of transducers, to increase the recording capacity. For example, FIG. 3 illustrates a structure of an HDD having two disks and storing data on both sides of each disk. Thus, two disks #1 (one) and #2 (two) need four heads #a, #b, #c, and #d.

Figure 4:
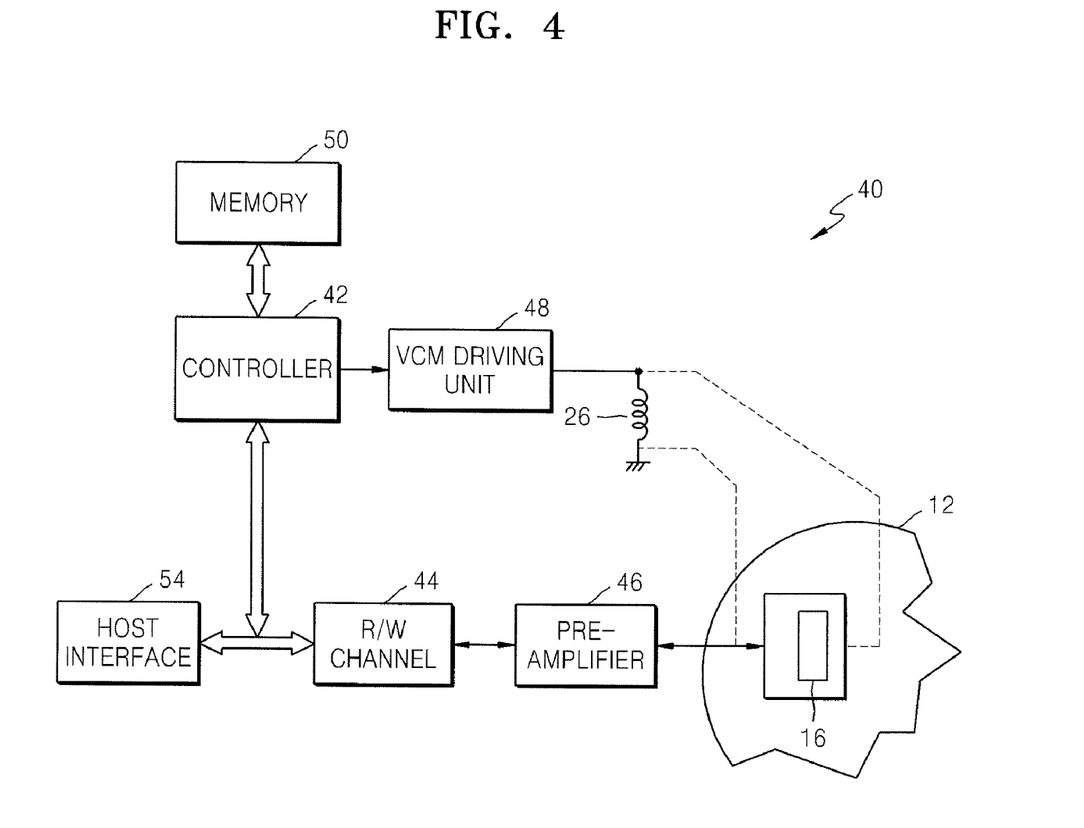
FIG. 4 is a block diagram illustrating an electrical circuit of a disk drive apparatus to which a data sector phase correction method according to an embodiment of the present general inventive concept is applied.

FIG. 4 illustrates an electric system 40 which can control the HDD. The electric system 40 includes a controller 42 coupled to the transducer 16 via a read/write (R/W) channel circuit 44 and a pre-amplifier circuit 46. The controller 42 may be a digital signal processor (DSP), a microprocessor, or a microcontroller. The controller 42 controls the read/write channel circuit 44 to read information from the disk 12 or write information to the disk 12. The controller 42 generates a sector pulse that indicates the position to write or read data in data write and data read modes, and a servo gate pulse to obtain a servo mark address signal. The controller 42 performs head switching control of the pre-amplifier 46 when accessing a different disk.

The controller 42 is connected to the voice coil motor (VCM) driving unit 48 that supplies drive current to the voice coil 26. The controller 42 supplies a control signal to the VCM driving unit 48 to control the voice coil motor 30 and the movement of the transducer 16. The controller 42 is coupled to a memory device 50. The memory device 50 contains commands and data used by the controller 42 to execute software routines. The software routines include a seek routine that moves the transducer 16 from one track to another. The seek routine includes a servo control routine to ensure accurate tracking of the transducer 16. The memory device 50 stores firmware and various control data to control the disk drive apparatus, and also includes program code to perform the methods described in the flow charts of FIGS. 5-7.

When a general disk drive apparatus operates in a data read mode, the pre-amplifier circuit 46 in the HDD amplifies an electric signal detected by the transducer 16 from the disk 12, selected according to head switching. The read/write channel circuit 44 encodes the signal read from the disk 12 to a digital signal according to the timing of a sector pulse to read, generated by the controller 42, converts the digital signal to stream data, and transmits the stream data to a host device (not illustrated) via a host interface circuit 54.

In a write mode, the disk drive apparatus receives data from the host device via the host interface circuit 54 and temporarily stores the data in an internal buffer (not illustrated) of the host interface circuit 54. The disk drive apparatus sequentially outputs the data stored in the internal buffer to the read/write channel circuit 44 where it is converted to binary data stream suitable for a write channel of the disk 12. Then, a write current amplified by the preamplifier circuit 46 is written onto the disk 12 through the transducer 16 at a point when a sector pulse to write is generated.

Figure 8:
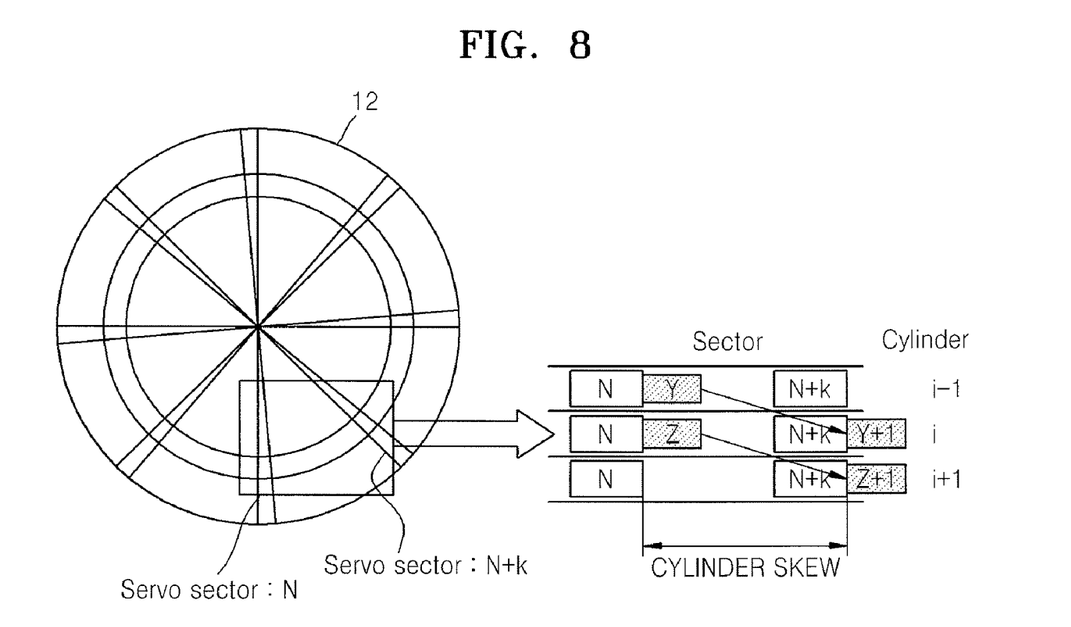
FIG. 8 illustrates the logical data sector arrangement according to an increase of cylinders on a same disk surface in a disk drive apparatus according to an embodiment of the present general inventive concept.

A cylinder skew related to an embodiment of the present general inventive concept will be described with reference to FIG. 8. The cylinder skew is the length of a track rotated for a period of moving a head to a target cylinder position when a cylinder accessed by the head changes. That is, in FIG. 8, the cylinder skew is generated as the disk rotates while the head moves from a logical data sector address Y of a servo sector N of a cylinder i−1 to a cylinder i on the same disk surface. Accordingly, at the point when the head is moved to the cylinder i, when a logical data sector address Y+1 is assigned to a servo sector N+k moved from the servo sector N as long as the magnitude of the cylinder skew, a data sector phase is accurately matched. Accordingly, when the head moves from a logical data sector address Z of the servo sector i+1 of the cylinder i to a cylinder i+1, the data sector phase is matched by assigning a logical data sector address Z+1 to the servo sector N+k of the cylinder i+1. The cylinder skew is uniform throughout the same disk.

Figure 9:
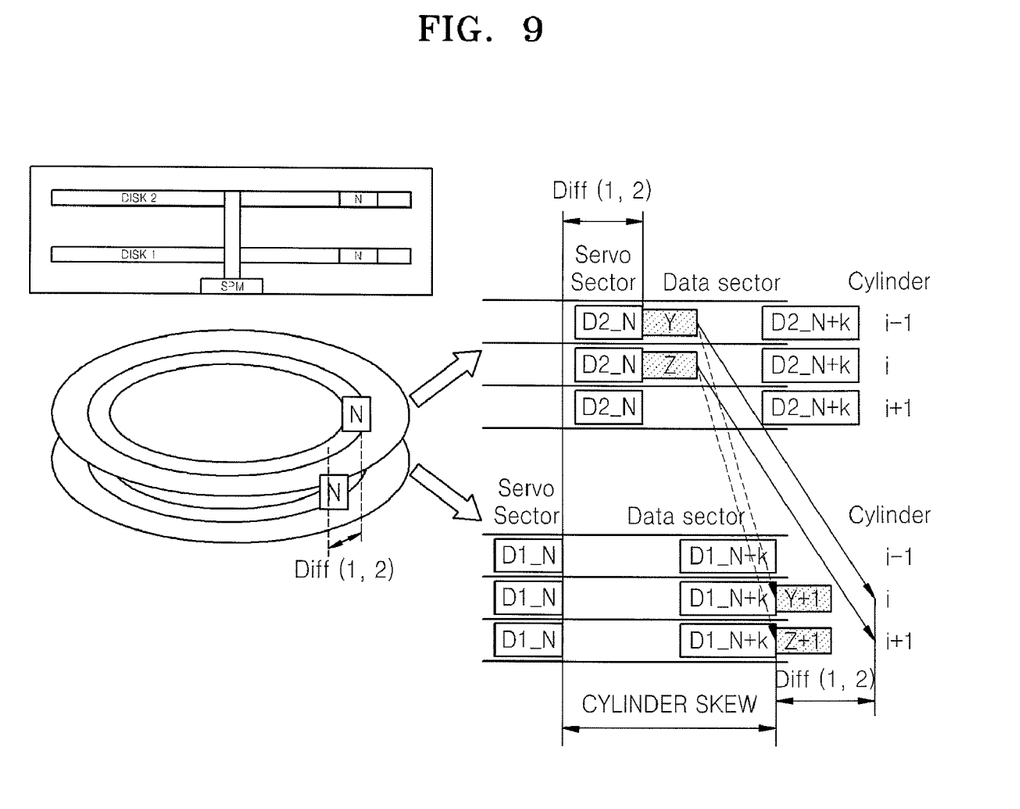
FIG. 9 illustrates a logical data sector arrangement according to an increase of cylinders during disk switching when a data sector phase correction method according to an embodiment of the present general inventive concept is not applied.

When a plurality of disks are switched in a disk drive apparatus, as illustrated in FIG. 9, irregular rotational slip occurs between disks. In FIG. 9, it is assumed that no rotational slip exists between disks one and two, that is, a value of Diff(l,j) indicating a phase difference of the servo sector between the disks is 0. In this condition, when the head is switched at the logical data sector address Y of the servo sector N of the cylinder i−1 of disk two and moved to the cylinder i of disk 1, as indicated by a dotted line in FIG. 9, the head is supposed to be located at a logical data sector address Y+1 of the servo sector N+k of the cylinder i.

However, in FIG. 9, it is assumed that rotational slip exists between disks one and two, that is, the value of Diff(l,j) is not 0. In this condition, when the head is switched at the logical data sector address Y of the servo sector N of the cylinder i−1 of disk two and moved to the cylinder i of disk one, as indicated by a solid line in FIG. 9, the head is located at a point having a difference of Diff(i,j) from a logical data sector address Y+1 of the servo sector N+k of the cylinder i. Diff(i,j) signifies the amount of rotational slip between a disk i and a disk j when the head is switched from the disk j to the disk i.

However, irregular rotational slip between the disks is generated when an external or internal force, for example, an impact, is applied to the disk drive apparatus or the disk drive apparatus is assembled after the external servo track write. Thus, the rotational slip may vary according to force. In an embodiment of the present general inventive concept, the controller 42 of FIG. 4 measures of the amount of rotational slip between the disks and adjusts cylinder skew during disk switching.

Figure 5:
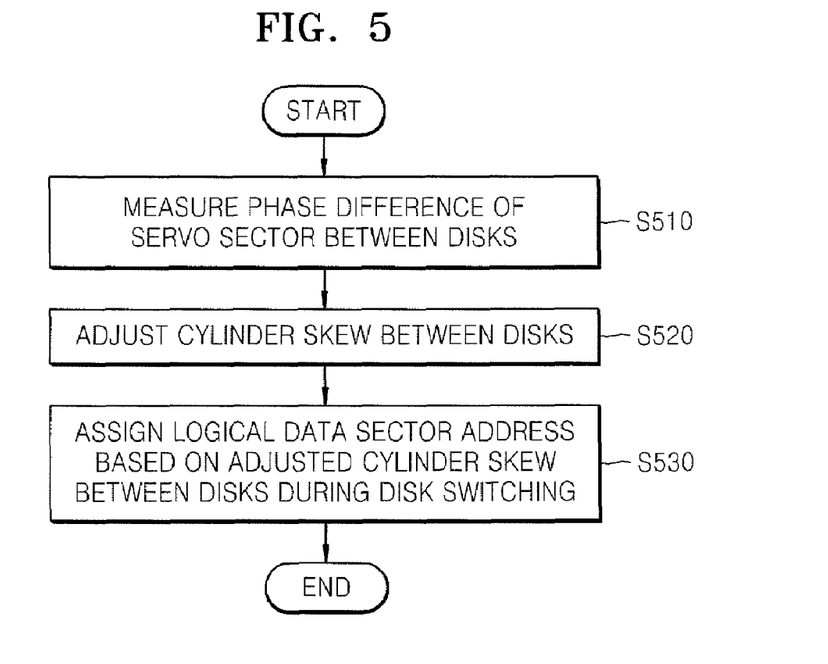
FIG. 5 is a flow chart illustrating the data sector phase correction method according to an embodiment of the present general inventive concept.

The control process performed by the controller 42 to correct a phase of a data sector due to rotational slip between the disks will be described in detail with reference to FIG. 5. First, the difference in phase of a servo sector between the disks is measured (operation S510). The phase difference of the servo sector between the disks is measured by the following two methods.

Figure 6:
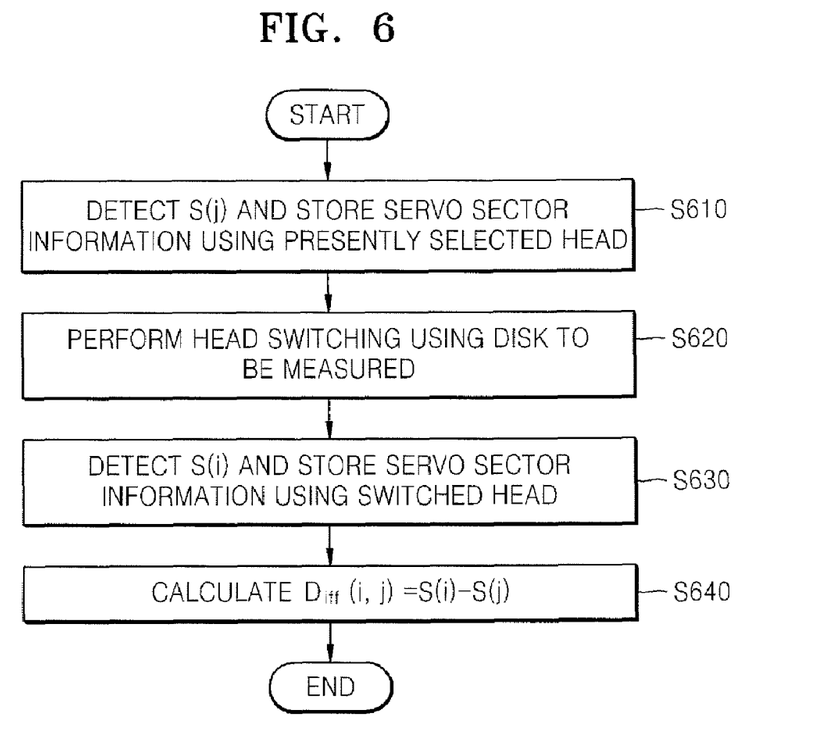
FIG. 6 is a flow chart illustrating a method of measuring a phase difference of a servo sector between disks according to an embodiment of the present general inventive concept.

The first method to measure the phase difference of the servo sector between the disks (i,j) will be described with reference to FIG. 6. Referring to FIG. 6, the controller 42 controls the detection of servo sector information S(j) from the disk j, using the head that is presently selected, and the storing of the detected information in the memory device 50 (operation S610). The servo sector information can be obtained from the gray code of the servo signals illustrated in FIG. 2. Then, the controller 42 switches the head to the disk i to be measured (operation S620). After the head switching, the controller 42 controls the detection of servo sector information S(i) of the servo sector that arrives first from the disk i and the storing of the detected information in the memory device 50 (operation S630). Next, the controller 42 reads the servo sector information S(i) and S(j) from the memory device 50 and calculates the phase difference Diff(i,j) of the servo sector between the disks i and j, as in Equation 1 (operation S640).

$$\text{Diff}(i,j) = S(i) - S(j) \qquad \text{[Equation 1]}$$

In Equation 1, Diff(i,j) indicates the number of servo sectors included between the servo sector information detected from the disk j and disk i before and after the head switching. That is, it is the difference in the servo sector number before and after the head switching. Thus, the phase difference of the servo sector between the disks can be measured by this method.

Figure 7:
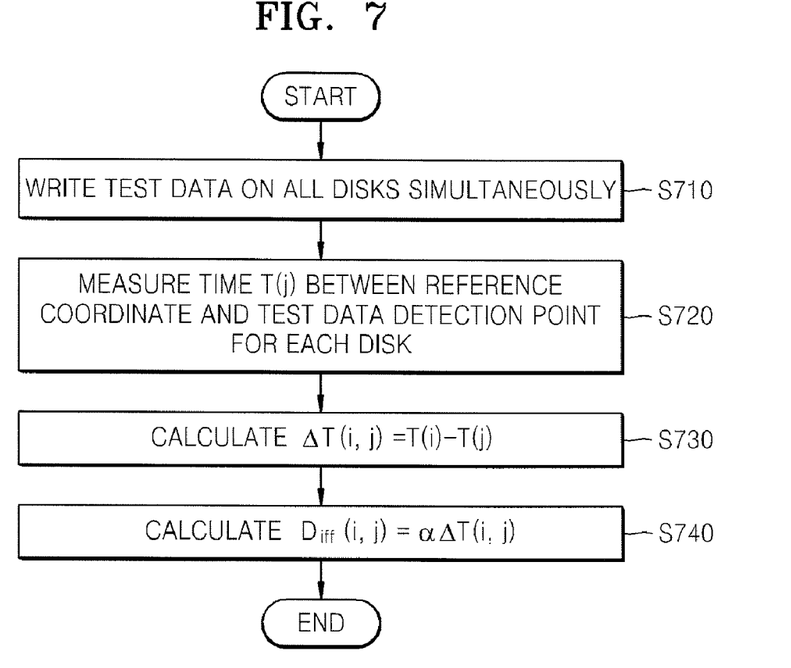
FIG. 7 is a flow chart illustrating a method of measuring a phase difference of a servo sector between disks according to another embodiment of the present general inventive concept.

The second method to measure the phase difference of the servo sector between the disks i and j will be described with reference to FIG. 7. Referring to FIG. 7, the controller 42 controls the writing of test data simultaneously on all disks in the drive (operation S710). As an example, the test data is written on the cylinder in a system area, where data is not written. The system area is an area to store basic information to write and read data in the disk drive apparatus, including defect position information, servo parameter information, and channel parameter information. The system area is typically referred to as a maintenance cylinder area.

The length of time T(i) between a reference coordinate and a point where the test data is detected for each disk is measured (operation S720). The reference coordinate can be determined as an arbitrary sector position. As an example, the position where the servo index mark (SIM) is detected can be determined as a reference coordinate.

When the reference coordinate is defined as the position where the SIM is detected, T(i) is measured by using a counter (not illustrated) included in the controller 42 to count the number of reference clock cycles from the point where the SIM is detected to the point where the test data is detected, for the cylinder of each disk where the test data is written. The controller 42 calculates the length of time $\Delta T(i,j)$ corresponding to the amount of rotational slip between the disks, as illustrated in Equation 2 (operation S730).

$$\Delta T(i,j)=T(i)-T(j) \quad \text{[Equation 2]}$$

In Equation 2, T(i) is obtained by counting the reference clock cycles from a reference coordinate to a point where the test data is detected on the disk (i) after the head switching. T(j) is obtained by counting the reference clock cycles from a reference coordinate to a point where the test data is detected on the disk (j) before the head switching. Accordingly, $\Delta T(i,j)$ is the time corresponding to the amount of rotational slip between the disks (i,j).

Next, the controller 42 calculates the phase difference Diff (i,j) of the servo sector between the disks (i,j) using $\Delta T(i,j)$ calculated from Equation 2, as illustrated in Equation 3 (operation S740).

$$\text{Diff}(i,j)=\alpha\Delta T(i,j) \quad \text{[Equation 3]}$$

In Equation 3, "α" is a proportional constant to convert the time measured with the reference clock to a number of data sectors. That is, when "n" clock cycles are generated in a data sector section, "α" is equal to "1/n". In an embodiment of the present general inventive concept, "α" can be set as a proportional constant to convert the time measured with the reference clock to the data servo sector number. The value below the decimal point of Diff(i,j) is raised up. This gives the rotational slip in units of data sectors or servo sectors.

As described above, the operation (operation S510 of FIG. 5) to measure the phase difference of the servo sector between the disks can be performed according to the flow chart as illustrated in FIG. 6 or 7. Referring to FIG. 5, the cylinder skew between the disks is adjusted during the head switching by using the phase difference Diff(i,j) of the servo sector between the disks, measured in operation S510 (operation S520).

That is, as illustrated in FIG. 9, when the phase difference Diff(i,j) of the servo sector between the disks is not zero, and the logical data sector is assigned by applying the initially set cylinder skew value during the disk switching, the head cannot be accurately moved to the target data sector position. Accordingly, the cylinder skew is adjusted during the disk switching by reflecting the phase difference Diff(i,j) of the servo sector between the disks in operation S520. That is, the cylinder skew is adjusted with a value obtained by adding Diff(i,j) to the cylinder skew value set during the initial design.

Then, the logical data sector address is assigned based on the adjusted cylinder skew value between the disks during the disk switching according to the head switching (operation S530). That is, as illustrated in FIG. 10, the logical data sector address is assigned by adding the phase difference Diff(i,j) of the servo sector between the disks, according to the rotational slip, to the initially set cylinder skew value during the disk switching.

Figure 10:
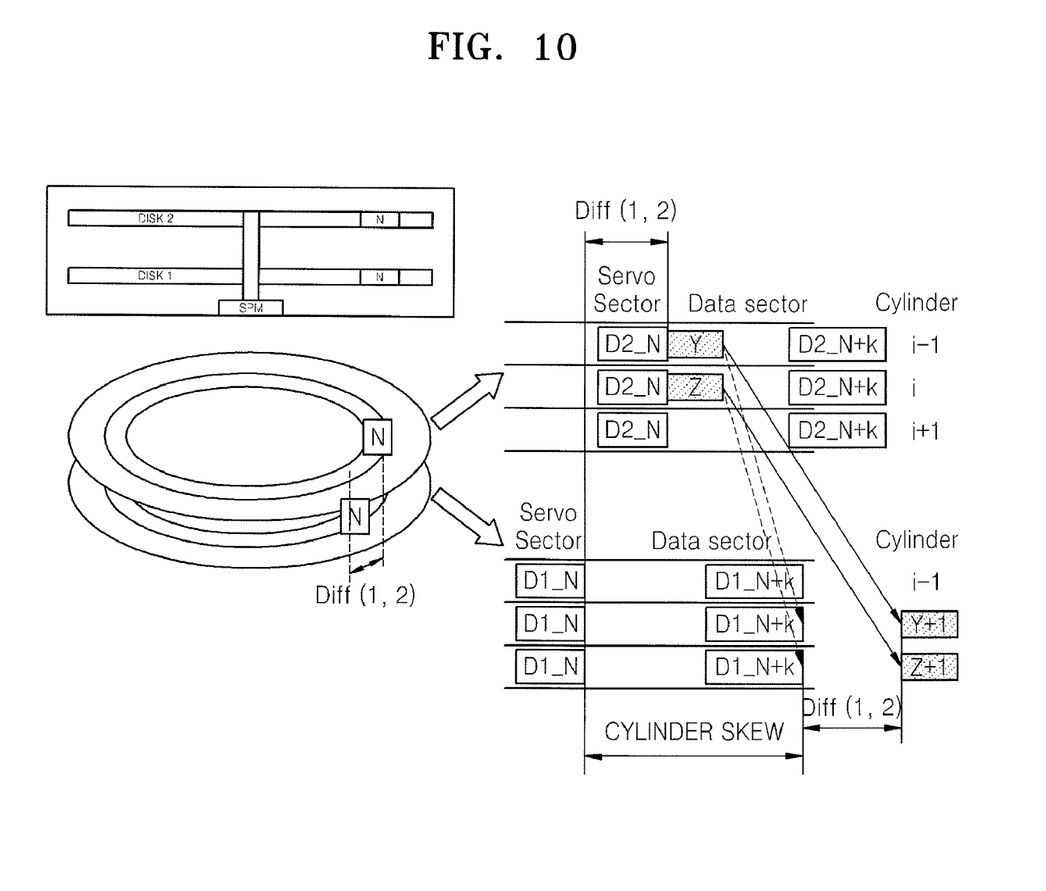
FIG. 10 illustrates a the logical data sector arrangement according to an increase of cylinders during disk switching when a data sector phase difference correction method according to an embodiment of the present general inventive concept is applied.

Referring to FIG. 10, the cylinder skew is corrected by adding the phase difference Diff(1,2) of the servo sector between the disks one and two to the cylinder skew value, and the logical data sector address is assigned during the head switching from disk two to disk one Then, when the head is switched and moved from the logical data sector address Y of the servo sector N of the cylinder i−1 of disk two to the cylinder i of disk one, the head is accurately located at the target logical data sector address Y+1. In the same method, when the head is switched and moved from the logical data sector address Z of the servo sector N of the cylinder i of disk two to the cylinder i+1 of disk two, the head is accurately located at the target logical data sector address Z+1 as illustrated in FIG. 10.

The present general inventive concept can also be embodied as a computer-readable code on a computer-readable medium. The computer-readable medium can include a computer-readable recording medium and a computer-readable transmission medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, optical data storage devices, and media stored carrier waves (such as data transmission through the Internet). The computer readable recording medium can also be distributed over network coupled computer systems so that the computer readable code is stored and executed in a distributed fashion. The computer-readable transmission medium can transmit carrier waves or signals (e.g., wired or wireless data transmission through the Internet). Also, functional programs, codes, segments to accomplish the present general inventive concept can be easily construed by programmers skilled in the art to which the present general inventive concept pertains.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method to correct a phase of a data sector due to rotational slip of a disk in a plurality of disks, the method comprising:
   measuring a difference in a phase of a servo sector between the plurality of disks;
   adjusting an amount of cylinder skew between the plurality of disks based on the measured difference in the phase of the servo sector between the plurality of disks; and
   assigning an address of a logical data sector based on the amount of cylinder skew between the adjusted plurality of disks.

2. The method of claim 1, wherein the measuring of the difference in the phase of the servo sector between the plurality of disks comprises:
   reading servo sector information of one of the plurality of disks using a head that is presently selected, and storing the read servo sector information;

switching to a head corresponding to an other of the plurality of disks to be measured;

reading servo sector information from the other of the plurality of disks to be measured using the head that is switched, and storing the read servo sector information; and calculating a difference in the phase of the servo sector between the one disk and the other disk by calculating a number of servo sectors between the servo sector information read from the one disk before the head switching and the servo sector information read from the other disk after the head switching.

3. The method of claim 1, wherein the measuring of the difference in the phase of the servo sector between disks comprises:

writing test data on the plurality of disks simultaneously;

detecting a difference in a position where the test data is written with respect to a reference coordinate for each of the plurality of disks; and calculating a difference in the phase of the servo sector between the plurality of disks based on the difference of the position where the test data is written between the plurality of disks detected in the detecting of the difference of the position where the test data is written with respect to the reference coordinate for each disk.

4. The method of claim 3, wherein the test data is written in a system area of the plurality of disks.

5. The method of claim 3, wherein in the detecting of the difference of the position where the test data is written with respect to a reference coordinate for each of the plurality of disks, the difference in the test data writing position is detected by counting a number of reference clock cycles from the reference coordinate of each of the plurality of disks until the test data is detected, and calculating the difference in a count values between the plurality of disks.

6. The method of claim 3, wherein the difference in the phase of the servo sector between the plurality of disks is calculated in units of data sectors.

7. The method of claim 3, wherein the difference in the phase of the servo sector between the plurality of disks is calculated in units of servo sectors.

8. A computer-readable recording medium having embodied thereon a computer program code to execute a method to correct a phase of a data sector due to rotational slip of a disk in a plurality of disks, the method comprising:

measuring a difference in a phase of a servo sector between the plurality of disks;

adjusting the amount of cylinder skew between the plurality of disks based on the measured difference in the phase of the servo sector between the disks; and assigning an address of a logical data sector based on the amount of cylinder skew between the adjusted plurality of disks.

9. The method of claim 8, wherein the measuring of the difference in the phase of the servo sector between a plurality of disks, the method comprises:

reading servo sector information of one of the plurality of disks using a head that is presently selected, and storing the read servo sector information;

switching to a head corresponding to an other of plurality of disks to be measured;

reading servo sector information from the other disk to be measured using the head that is switched, and storing the read servo sector information; and calculating a difference in the phase of the servo sector between the one disk and the other disk by calculating the number of servo sectors between the servo sector information read from the one disk before the head switching and the servo sector information read from the other disk after the head switching.

10. The method of claim 8, wherein the measuring of the difference in the phase of the servo sector between disks comprises:

writing test data on the plurality of disks simultaneously;

detecting a difference in a position where the test data is written with respect to a reference coordinate for each of the plurality of disks; and calculating a difference in the phase of the servo sector between the plurality of disks based on the difference of the position where the test data is written between the plurality of disks detected in the detecting of the difference of a position where the test data is written with respect to a reference coordinate for each of the plurality of disks.

11. A disk drive apparatus, comprising:

a plurality of disks to store information;

a plurality of transducers to write or to read information on the plurality of disks; and a controller to measure a phase difference of a servo sector between the plurality of disks due to the rotational slip of the disk in the plurality of disks, to adjust an amount of cylinder skew of a logical data sector between the plurality of disks based on the measured phase difference of the servo sector between the plurality of disks, and to assign a logical data sector address by reflecting the adjusted cylinder skew amount.

12. The apparatus of claim 11, wherein the controller measures the phase difference of the servo sector between the plurality of disks by calculating a number of servo sectors between servo sector information detected from each of the plurality of disks before and after a switching of a head from a disk that is presently selected to another disk.

13. The apparatus of claim 11, wherein the controller writes test data on the plurality of disks by simultaneously selecting the plurality of disks, detects a difference in a position where the test data is written with respect to a reference coordinate for each of the plurality of disks, and measures the phase difference of the servo sector between the plurality of disks based on the detected difference in the test data writing position between the plurality of disks.

14. The apparatus of claim 11, wherein the test data is written in system areas of the plurality of disks.

15. The apparatus of claim 13, wherein the controller detects the difference in the test data writing position by counting a number of reference clock cycles from the reference coordinate of each of the plurality of disks until the test data is detected and calculating the difference in count values between the plurality of disks.

16. The apparatus of claim 13, wherein the phase difference in the servo sector between the plurality of disks is calculated in units of data sectors.

17. The apparatus of claim 13, wherein the phase difference in the servo sector between the plurality of disks is calculated in units of servo sectors.

18. The apparatus of claim 11 wherein the controller assigns an address of the logical data sector of a disk that is switched by adjusting the cylinder skew of the logical data sector as long as a magnitude corresponding to the measured phase difference of the servo sector between the plurality of disks.

* * * * *